(12) United States Patent
Schmidt et al.

(10) Patent No.: US 6,895,081 B1
(45) Date of Patent: May 17, 2005

(54) PREDICTING PERFORMANCE OF TELEPHONE LINES FOR DATA SERVICES

(75) Inventors: Kurt E. Schmidt, Burlington, WI (US); David J. Groessl, Vernon Hills, IL (US); Yun Zhang, Wheeling, IL (US)

(73) Assignee: Teradyne, Inc., Boston, MA (US)

( * ) Notice: Subject to any disclaimer, the term of this patent is extended or adjusted under 35 U.S.C. 154(b) by 0 days.

(21) Appl. No.: 09/294,563

(22) Filed: Apr. 20, 1999

(51) Int. Cl.[7] .......................... H04M 1/24; H04M 3/08; H04M 3/22

(52) U.S. Cl. .................. 379/1.01; 379/1.04; 379/22.04; 379/27.01; 379/15.03

(58) Field of Search .......................... 379/15.03, 22.04, 379/27.01, 27.02, 27.03, 28, 29.08, 1–2, 5–6, 7, 21, 22–30, 35; 324/528–534, 525–527, 539, 542, 543

(56) References Cited

U.S. PATENT DOCUMENTS

| | | | |
|---|---|---|---|
| 4,087,657 A | * 5/1978 | Peoples | |
| 5,128,619 A | * 7/1992 | Bjork et al. | |
| 5,157,336 A | 10/1992 | Crick | 324/613 |
| 5,302,905 A | 4/1994 | Crick | 324/613 |
| 5,400,321 A | * 3/1995 | Nagato | |
| 5,436,953 A | 7/1995 | Nilson | 379/27 |
| 5,699,402 A | 12/1997 | Bauer et al. | 379/26 |
| 5,864,602 A | 1/1999 | Needle | 379/6 |
| 5,881,130 A | 3/1999 | Zhang | 379/6 |
| 6,091,713 A | * 7/2000 | Lechleider et al. | |
| 6,192,109 B1 | * 2/2001 | Amrany et al. | |
| 6,292,539 B1 | * 9/2001 | Eichen et al. | |
| 6,349,130 B1 | * 2/2002 | Posthuma et al. | |

FOREIGN PATENT DOCUMENTS

| | | | |
|---|---|---|---|
| WO | WO 99/63427 A | 12/1999 | G06F/9/00 |

OTHER PUBLICATIONS

Testing in the unbundled loop: the challenge for ILECs & CLECs, copyright 1997, Harris Corporation, pp. 7–8.*

Eichen, E. et al.: "DSTS: An Expert System for Diagnosis of Advanced Digital Subscriber Services," IEEE Network Operations and Management Symposium, US, New York, NY: IEEE, vol. Conf. 10, pp. 794–804 XP000793427; ISBN: 0–7803–4352–2; the whole document.

Hedlund, Eric; Cullinan, Tom: DSL Loop Test Telephony, vol. 235, No. 8, Aug. 24, 1998, pp. 48–52, XP002147002 USA; the whole document.

Co–Pending U.S. Appl. No. 09/285,954 filed Apr. 2, 1999 which was filed from U.S. Provisional Patent Application Serial No. 60/106,845 filed Nov. 3, 1998.

Goralski, "xDSL Loop Qualification and Testing", IEEE Communications Magazine, May 1999.

"Loop Qualification, Prerequisite for Volume xDSL Deployment?", The TeleChoice Report On xDSL, vol. Two, No. 3, Mar. 1997.

Woloszynski, "It's Here", Bellcore Exchange Magazine, Jun. 1998.

Stewart, "Testing ADSL: The Easier, The Better", America's Network, Dec. 15, 1998.

Hekimian Product Information Release, "Introducing Hekimian's Comprehensive ADSL Test Solution".

Harris Communications, National Communications Forum Presentation, Chicago, IL, Oct. 5, 1998.

Turnstone Systems, Inc., Product Literature & Presentation at Turnstone Systems, Inc., Sep. 1992.

* cited by examiner

*Primary Examiner*—Duc Nguyen
(74) *Attorney, Agent, or Firm*—Teradyne Legal Department

(57) ABSTRACT

A method characterizes a customer line for data transmission. The method includes measuring electrical properties of the customer line from a central location, identifying a line model from the measurements, and identifying a modem model for a modem selected for use with the customer line. The modem model gives performance data for the selected modem. The method also predicts performance data for the customer line when operated with the selected modem by combining the line and modem models.

49 Claims, 13 Drawing Sheets

PREDICTING PERFORMANCE OF TELEPHONE LINES FOR DATA SERVICES

BACKGROUND OF THE INVENTION

This application relates generally to communications networks, and more particularly, to predicting the performance of telephone lines when transmitting data.

Public switched telephone networks, i.e., plain old telephone systems (POTS), were originally designed for voice communications having a limited frequency range. Today, the same POTS lines often carry data transmissions. Since data transmissions generally have different frequency properties, a POTS line that works well for transmitting voice may work poorly for transmitting data. Since POTS lines may not work well for data transmissions, both telephone operating companies (TELCO's) and customers want tests for predicting which lines can transmit data.

In the past, telephone operating companies (TELCO's) performed pre-qualification and pre-disqualification tests on POTS lines prior to connecting data transmitters to them. These tests identified some situations where the line can or cannot support data transmissions without remedial actions. But, the pre-qualification and pre-disqualification tests both produced a significant number of mispredictions, i.e., false positives and false negatives.

More critically, current pre-qualification tests for POTS lines are frequently not automated and consequently labor intensive. Often, they demand skilled interpretations of high frequency parameters of a line to determine its data transmission capabilities at high speeds. The tests do not make full use of automated testing systems, e.g., as described in U.S. Pat. No. 5,699,402, which is herein incorporated by reference in its entirety. At a network scale, such tests would be very expensive to implement.

Furthermore, as data transmission demands increase, simple pre-qualification or pre-disqualification is no longer sufficient. Now, customers also want information enabling them to choose between competing options for transmitting data. Instead of simple qualification or disqualification, the customer frequently wants to know which transmission medium and/or devices will work better. Simple pre-qualification does not provide customers with a way to compare the different viable options for transmitting data.

The present invention is directed to overcoming or, at least, reducing the affects of one or more of the problems set forth above.

SUMMARY OF THE INVENTION

In a first aspect, the invention provides a method of predicting the performance of a customer line for data transmission. The method includes measuring electrical properties of the customer line from a central location, identifying a line model from the measurements, and identifying a modem model for a modem selected for use with the customer line. The modem model gives performance data for the selected modem. The method also predicts performance data for the customer line when operated with the selected modem by combining the line and modem models.

In a second aspect, the invention provides a method of speed qualifying a customer line for data transmission. The method includes identifying a proxy line, performing one-ended electrical measurements on the proxy line, and predicting a data rate for the customer line from the measurements. The customer line is unconnected to a central switch from which the one-ended measurements are performed. The proxy line is connected to the switch and is also located in the same cable carrying the customer line.

In a third aspect, the invention provides a system for speed qualifying customer lines for data transmission. The system includes a computer, a telephony switch coupled to a portion of the lines, and a measurement unit coupled to both the switch and the computer. The switch is adapted to connect the portion of the lines to a network, to perform one-ended electrical measurements on the portion, and to transmit the measurements to the computer. The measurement unit orders the measurements on a selected line in response to receiving a command from the computer. The computer predicts a data rate for the selected line from the results of the measurements.

In a fourth aspect, the invention provides a method of marketing telephone lines to customers. The method includes speed pre-qualifying a plurality of the lines using one-ended electrical measurements performed from a central location. The method sets billing rates for, at least, a portion of the lines at prices that depend on the speed qualification thereof.

In a fifth aspect, the invention provides a method of marketing telephone lines to customers. The method includes speed qualifying each customer line using one-ended electrical measurements and offering high-speed service to a portion of the customers in response to the portion having lines qualified to support high-speed service. The speed qualification classifies each line for either high-speed service or low speed service.

In a sixth aspect, the invention provides a method of marketing telephone lines to customers. The method includes using one-ended electrical measurements to speed pre-qualify each line for either high-speed service or low speed service. The method also includes selectively connecting at least a portion of the lines qualified for high-speed service to particular customers in response to receiving a request for high-speed service from the particular customers.

BRIEF DESCRIPTION OF THE DRAWINGS

Other objects, features, and advantages of the invention will be apparent from the following description taken together with the drawings in which.

DESCRIPTION OF THE PREFERRED EMBODIMENTS

This application incorporates U.S. Ser. No. 60/106,845, filed Nov. 3, 1998, by Roger Faulkner et al, by reference in its entirety.

Speed Qualification System

Figure 1:
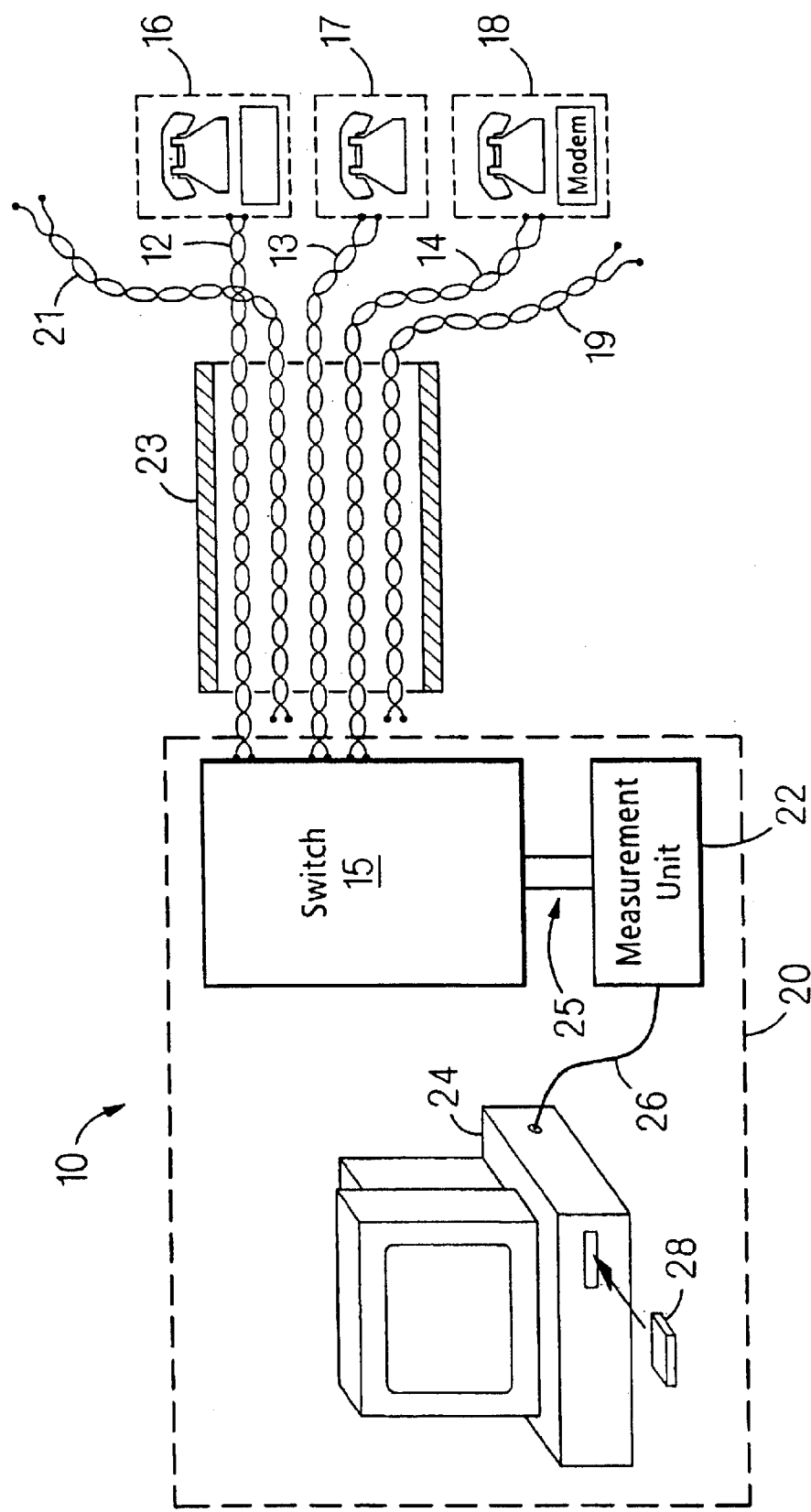
FIG. 1 illustrates a system to speed qualify customer telephone lines for data transmission.

FIG. 1 illustrates a portion of a POTS telephone network 10 for speed qualifying customer telephone lines 12–14, 19, 21. The network 10 includes the customer lines 12–14 that connect customer units 16–18, i.e., modems and/or telephones, to a switch 15 located in a TELCO central office 20. Each line 12–14 is a standard twisted two-wire copper line adapted for telephone voice communications. The two wires are generally referred to as the ring "R" and tip "T" wires. The switch 15 may be a POTS switch or any other device for connecting the lines 12–14 to a telephone network, e.g., a digital subscriber loop access multiplexer (DSLAM) (not shown). A very large portion of the length of each customer line 12–14 is housed in a standard telephone cable 23 that caries a number of the customer lines 12–14 i.e., more than a dozen. The telephone cable 23 is an environment, which changes the electrical and transmission properties of the individual customer lines 12–14.

The standard cable 23 also houses customer lines 19, 21, i.e., standard twisted pair telephony wires, that are not connected either to the switch 15 or to the customer units 16–18. These lines 19, 21 have been fabricated into the cable in anticipation of increased customer demand at future times. Some of the unconnected lines 19, 21 go to customer residences already having a connected POTS line, e.g., the line 19 goes to the customer connected to the line 14. The other unconnected lines 21 are not routed to a particular customer's residence. But, all the lines 12–14, 19, 21, i.e., connected or unconnected, have a very large portion of their length confined to the telephony cable 23, which similarly influences the transmission properties of each line 12–14, 19, 21 therein.

A measurement unit 22 couples to the switch 15 in the central office 20 via a test bus 25. The measurement unit 22 controls one-ended electrical measurements from the central office 20, which are used to obtain admittances and noise levels for the lines 12–14 being measured. To perform a measurement, the measurement unit 22 signals the switch 15 to disconnect a selected line 12–14 from the telephone network and to connect the selected line 12–14 to measurement apparatus (not shown) within the switch 15. Then, the measurement unit 22 signals the apparatus to perform selected measurements. The measurement unit 22 signals the switch 15 to reconnect the line 12–14 to the network after measurements are completed. The bus 25 returns results from the measurements to the measurement unit 22. Such measurements are described in more detail in U.S. Application Ser. No. 60/106,845.

The measurement unit 22 is controlled by the computer 26, which selects the type of measurements to be performed and the lines 12–14 upon which the measurements will be performed. The computer 24 sends control signals to the measurement unit 22 through the line 26 and receives data the measurement results from the measurement unit 22 via the same line 26. An executable software program, encoded on storage medium 28, coordinates the tests by the measuring unit 22 and the processing of test data to predict data rates.

The measurement unit 22 and computer 24 speed qualify and/or disqualify the customer lines 12–14 and associated modems for selected data transmission speeds. To speed qualify, the computer 28 must determine, with a high degree of certainty, that the qualified line and associated modems will support data transmissions at a specified data rate without remedial measures. To speed disqualify, the computer 28 must determine, with a high degree of certainty, that the disqualified line and associated modems will not support data transmissions at the specified data rate without remedial measures.

Various embodiments make speed qualification determinations either before the line is in service or while the line is in service. Before a line is transmitting data, the determinations are speed pre-qualifications or pre-disqualifications. After a line is transmitting data, determinations are referred to as speed path testing.

One-Ended Measurements on Customer Line

Figure 2:
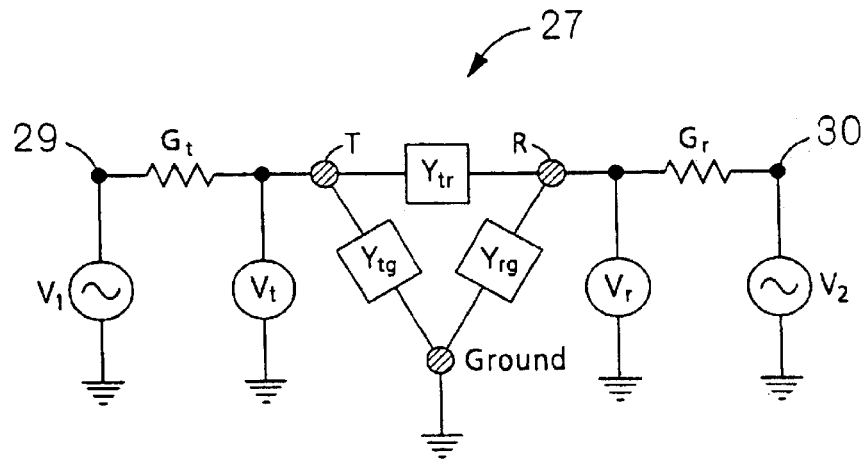
FIG. 2 illustrates a test apparatus for performing one-ended admittance measurements on twisted-pair telephone lines.

FIG. 2 illustrates an apparatus 27 for performing one type of one-ended electrical measurement used for speed qualifying and/or speed disqualifying of the lines 12–14 of FIG. 1. The apparatus 27 measures the admittances of the tip and ring wires T, R of the selected customer line under measurement. The tip and ring wires T, R of the line 12–14 being measured couple to driving voltage sources $V_1$ and $V_2$, respectively, through known conductances $G_t$ and $G_r$. The tip T and ring R wires also connect to voltmeters $V_t$ and $V_r$ for reading the voltage between the tip wire T and ground and between the ring wire R and ground, respectively. The readings from the voltmeters $V_t$ and $V_r$ enable the computer 24 to determine effective admittances $Y_{tg}$, $Y_{tr}$, $Y_{rg}$ between the tip wire T, ring wire R, and ground for the customer line 12–14 being measured.

To determine the admittances $Y_{tg}$, $Y_{tr}$, $Y_{rg}$ the switch 15 connects the voltage sources $V_{1\ and\ V2}$ and the voltmeters VT and $V_R$ to the tip and ring wires T, R as shown in FIG. 2. After connecting the apparatus 27, the measurements needed to determine the admittances $Y_{tg}$, $Y_{tr}$, $Y_{rg}$ entail three steps. First, the measurement unit 22 grounds the point 29 and applies voltage $V_2$ while measuring the voltages across the voltmeters $V_r$ and $V_t$. Next, the measurement unit 22 grounds the point 30 and applies voltage $V_1$ while measuring the voltages across the voltmeters $V_r$ and $V_t$. Finally, the unit 22 applies both voltages $V_1$ and $V_2$ and measures voltages across the voltmeters $V_r$ and $V_t$. From these three measurements, the computer 24 determines the admittances $Y_{tg}$, $Y_{tr}$, $Y_{rg}$ at various frequencies.

During measurements for the admittances $Y_{tg}$, $Y_{tr}$, $Y_{rg}$, the apparatus 27 may apply complex driving voltages $V_1$ and $V_2$ that superimpose several frequencies. For example, the driving voltages $V_1$, $V_2$ may take the form: $V(N) = A\Sigma_{i=1-45} \cos(2\Pi\_f_i NT + \phi_i)$. The frequencies $f_i$, sampling cycle values N (at 152.6 Hz), and phases $\phi_i$ are shown in Appendix 1. The computer 24 Fourier transforms both the driving and measured voltages $V_1$, $V_2$, $V_t$, $V_r$ to separate frequency components. From the Fourier transform, the computer 24 finds the real and imaginary parts of the admittances $Y_{tg}$, $Y_{tr}$, $Y_{rg}$ by well-known circuit-analysis techniques.

From the admittances $Y_{tg}$, $Y_{tr}$, $Y_{rg}$ several derived properties of the lines 12–14 may be determined. First, a line length can be derived from the capacitances $C_{tg}$ and $C_{rg}$ of the tip wire T to ground and of the ring wire R to ground. For standard bundled telephony cables with twisted tip and ring wire T, R pairs, both capacitances are about $17.47 \times 10^{-9}$ Farads per 1,000 feet regardless of the gauge. Thus, the one-ended measurement of capacitances gives a measure of the apparent length of the measured line 12–14. Second, the existence of a bridged tap in one of the lines 12–14 can be derived from the existence of an above-threshold peak in the ratio:

$$\frac{IM\left(\frac{\partial^2 Y_{tg}(f)}{\partial f^2}\right)}{RE\left(\frac{\partial^2 Y_{tg}(f)}{\partial f^2}\right)}$$

The presence of a bridged tap substantially effects the capacative measurement of the length of the line. Third, the admittances $Y_{tg}$, $Y_{tr}$, $Y_{rg}$ can also be used to predict the gauge mix of the measured lines 12–14. The gauge mix of a line is the ratio of the sum of lengths of the line, which are fat wire, over the full length of the line. Typically, fat wire is 22 and 24 gauge wire, and thin wire is 26 gauge wire. The customer lines 12–14, 19, 21 of FIG. 1 may have segments of fat wire and segments of thin wire. Fourth, a frequency dependent attenuation up to high frequencies can be derived.

Figure 3:
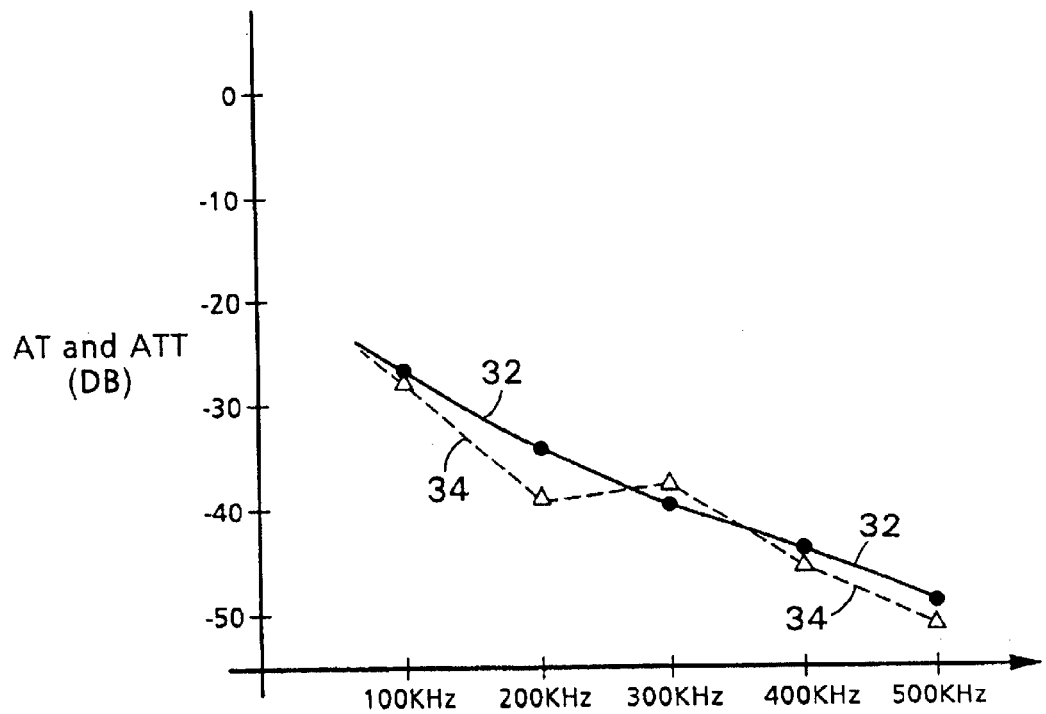
FIG. 3 graphically represents the frequency dependent attenuation both for an average twisted wire pair located in a standard telephony cable and for a particular customer line.
Figure 4A:
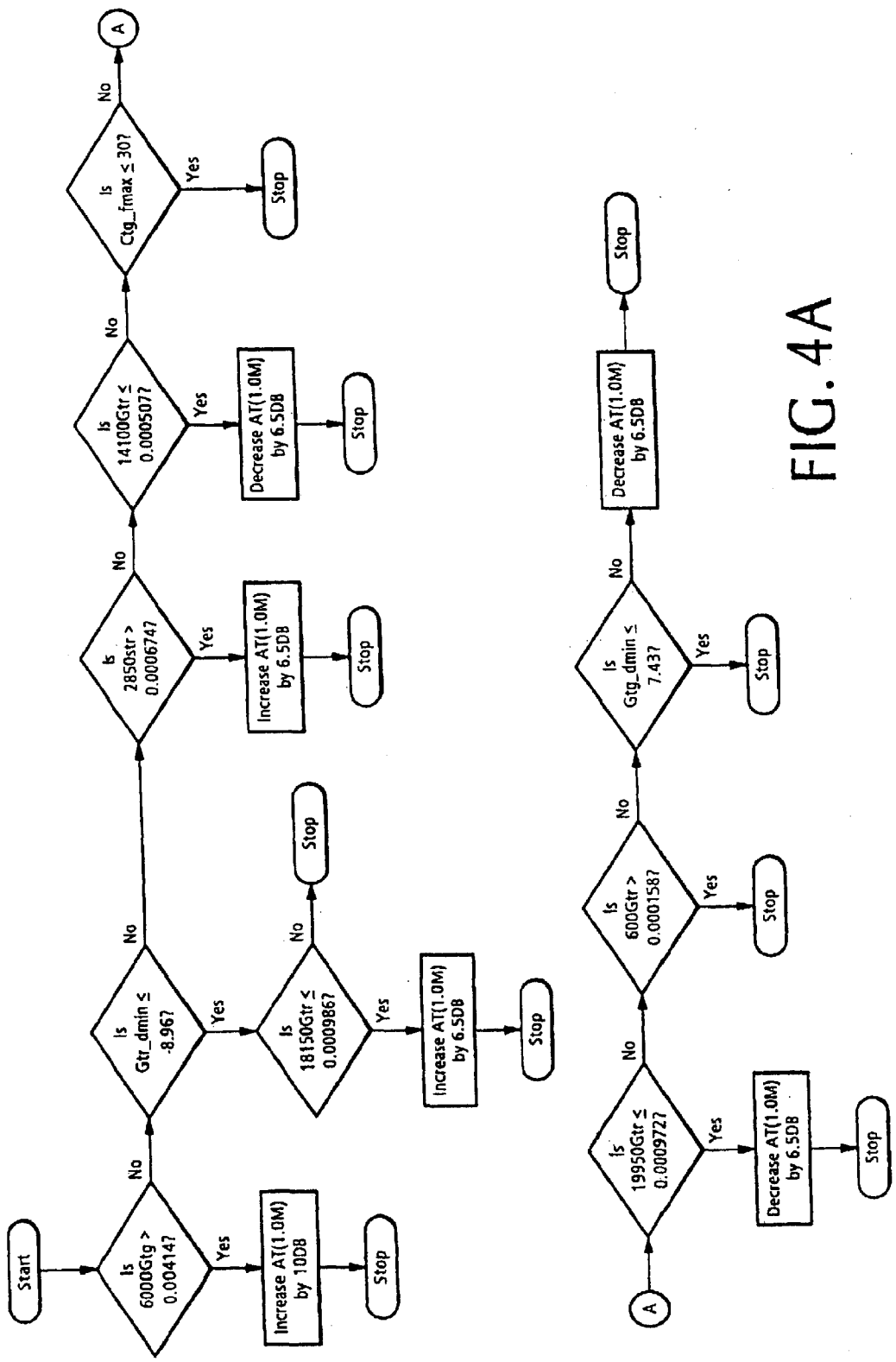
FIGS. 4A–4D are flow charts illustrating a method of finding the attenuation of a line from the attenuation for an average line of FIG. 3 and one-ended measurements.
Figure 4B:
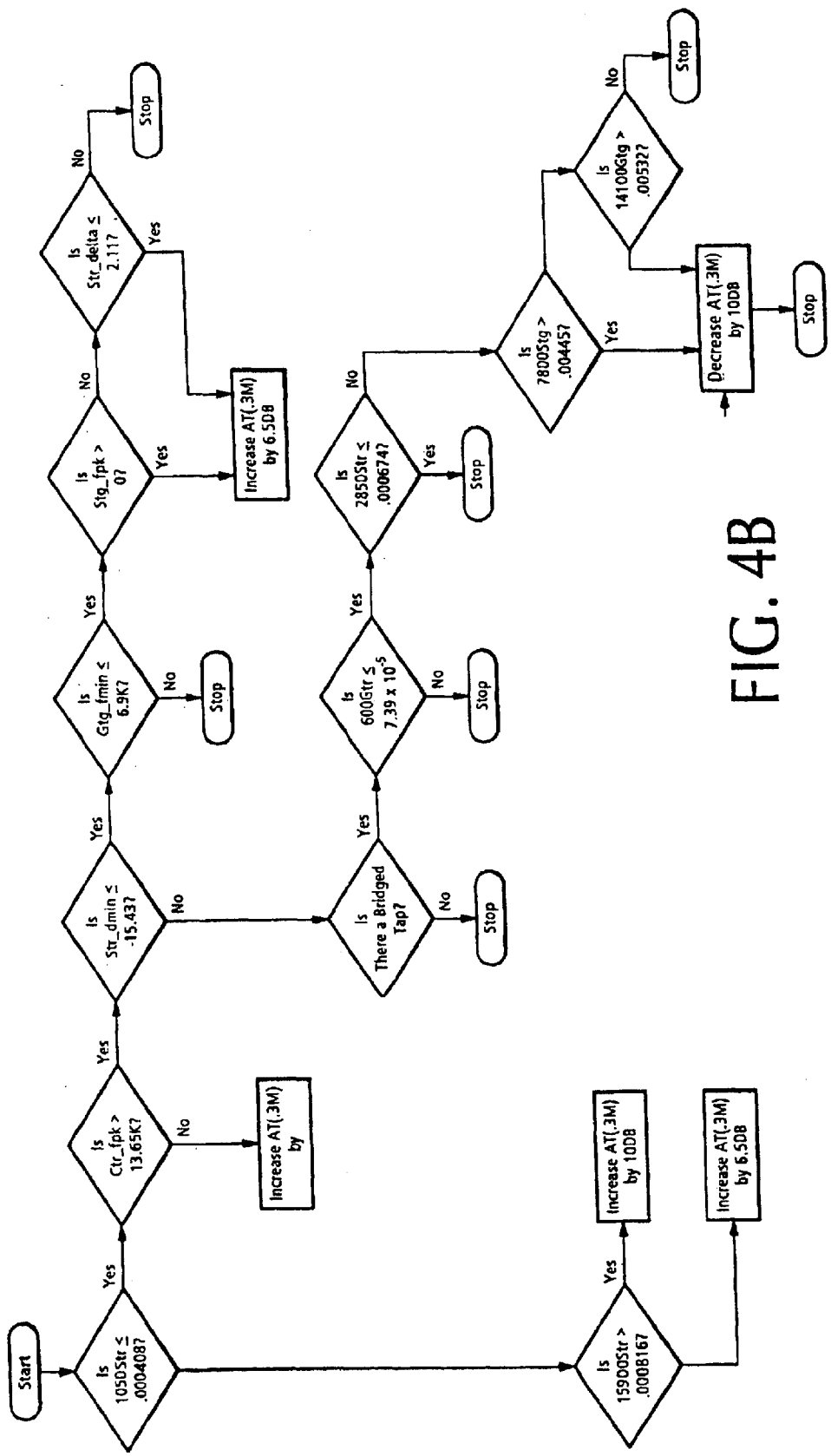
Figure 4C:
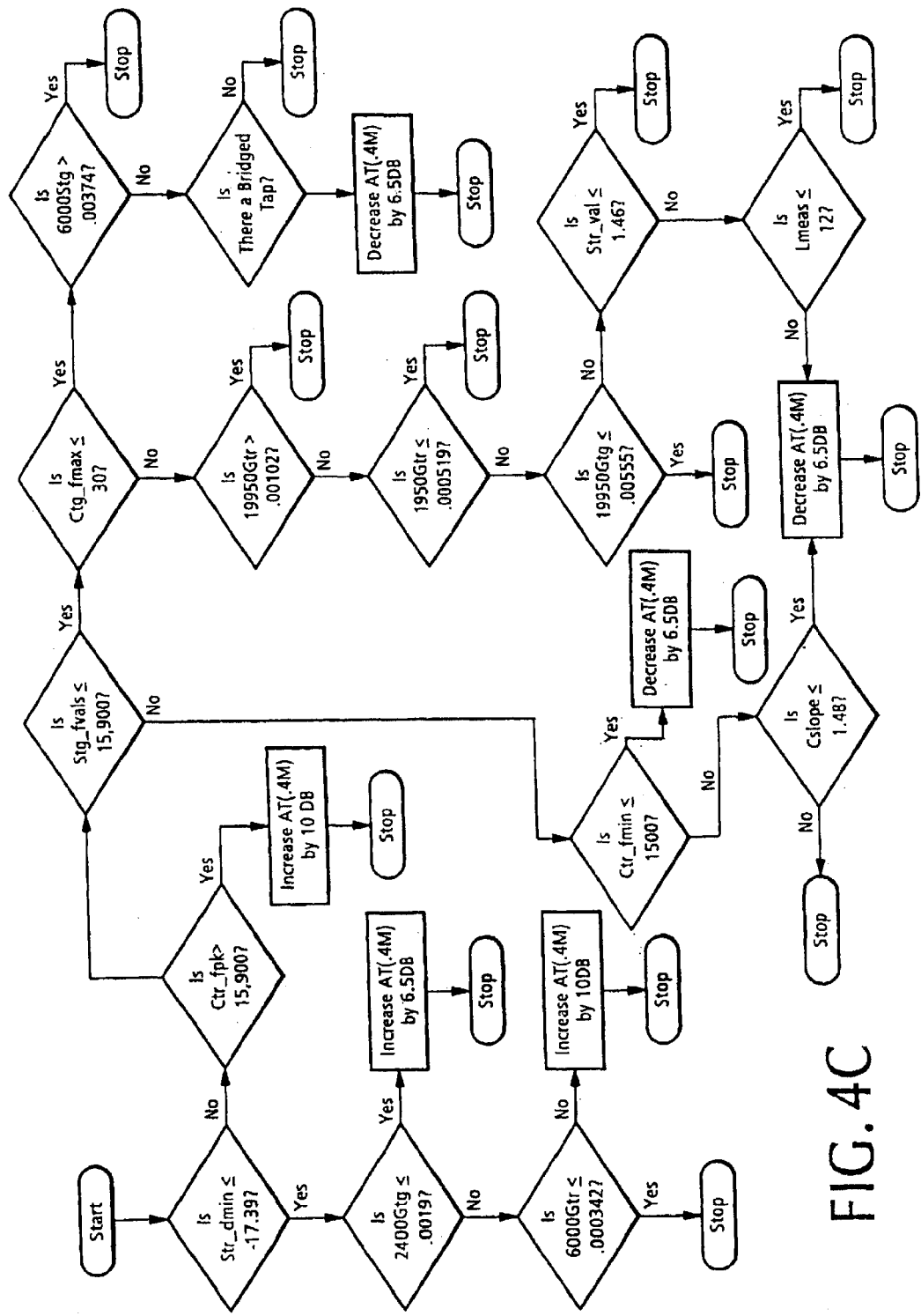
Figure 4D:
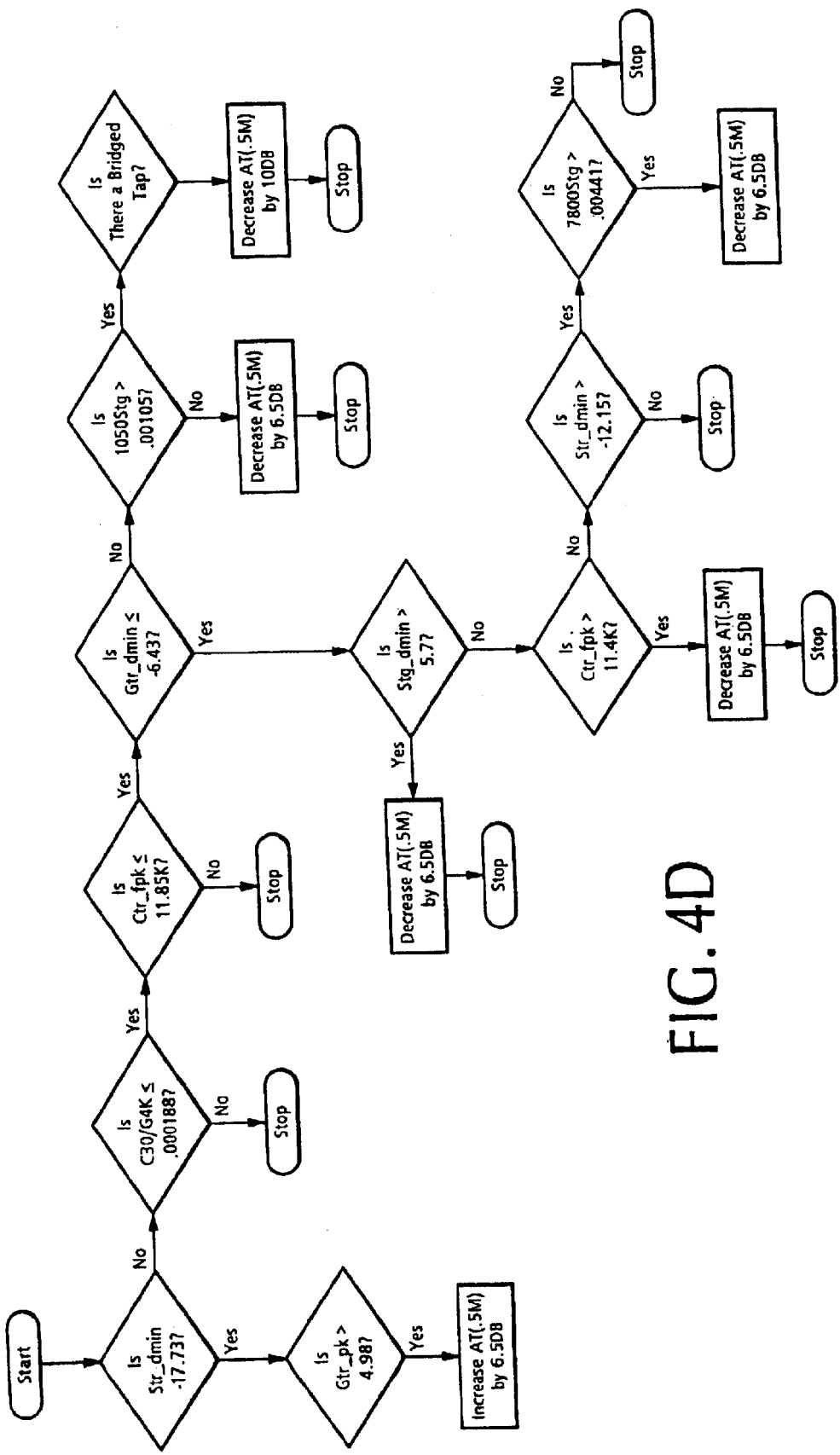

A two step procedure is used to derive the high frequency attenuation of the measured lines 12–14. First, the attenuation of the lines is approximated by the frequency (f) dependent average attenuation, AT(f). AT(f) is the attenuation of an "average" mixed gauge twisted copper line in a standard telephony cable. The average attenuation AT(f) is known to approximately be:

$AT(xMHz)=A(xMHz)C_{tg}$ with $(A(0.1\ MHz),A(0.3\ MHz),A(0.4\ MHz),A(0.5\ MHz))=(0.173, 0.24, 0.263, 0.288)DB/10-9F$ A solid curve 32, shown in FIG. 3, graphically illustrates the equation for AT(f) as a function of frequency. Second, for each customer line, the frequency dependent values of the AT(f) are adjusted using a method found through data mining. The second step produces the attenuation, ATT(f), for each customer line. ATT(f) is generally an improved value of the line's attenuation compared to the AT(f) for an average line.

Data mining produces a set of logical decision trees, which are used to find ATT(f). For each customer line, the computer 24 of FIG. 1 works through the set of logical decision trees. Each decision tree determines whether or not ATT(f), at one frequency, is shifted from the value of AT(f) at that frequency. At frequencies between those associated with logical decision trees, the computer 24 finds the value of ATT(f) by performing a smooth interpolation. The dashed line 34 of FIG. 3 shows the ATT(f) of one customer line, which was found by the logical decision tree analysis (M=106, K=103, and DB=decibels).

FIGS. 4A, 4B, 4C, and 4D are flow charts showing the decision trees for finding the values of ATT(0.1 MHz), ATT(0.3 MHz), ATT(0.4 MHz), and ATT(0.5 MHz), respectively. FIG. 3 shows the ATT(0.1 MHz), ATT(0.3 MHz), ATT(0.4 MH), and ATT(0.5 MHz) (triangles) of one customer line, which were found from the AT(0.1 MHz), AT(0.3 MHz), AT(0.4 MH), and AT(0.5 MHz) values (dots). Each decision tree uses logical tests based on lower frequency derived quantities, which are listed in Appendix 2. In Appendix 2, admittances are given in siemens, capacitances are given in Farads, and frequencies are given in Hertz unless otherwise indicated.

The result from each decision tree provides a value of ATT(f) at a higher frequency than the frequency used to measure the admittances $Y_{tg}$, $Y_{tr}$, and $Y_{rg}$. Thus, the logical decision trees enable the computer 24 to improve ATT(f) for each customer line, at frequencies higher than the frequencies at which measurements are performed on the line.

From a line's attenuation ATT(f), the computer 24 can derive a normalized line length (NLL). NLL(f) is the equivalent length of 26 gauge twisted copper telephony line to produce the attenuation ATT(f). The value of NLL(f) is approximately:

NLL(f)=ATT(f)/$\{\Sigma^{7}_{j=0},\ P_{j}\ (\log(f))^{j}\}$ where the $P_{j}$ are: $(P_{0}\ldots,\ P_{7})=10^{3}(-1.81718846839515,$ $2.3122218679438,\ -1.25999060284948,$ $0.38115981179243,\ -0.06912909837418,$ $0.00751651855434,\ -0.00045366936261,$ $0.00001172506721)$ Averaging NLL(f) over frequencies between 100 KHz and 1 Mhz provides a averaged normalized line length. The averaged normalized line length and a normalized noise define properties of a line model for the measured customer line 12–14, which allow the prediction of data transmission rates.

The one-ended measurements on the selected customer line 12–14 also include noise power spectra and impulse noise. Noise power spectra are determined directly through one-ended measurements using a spectrum analyzer (not shown) located in the measurement unit 22. Impulse noise measurements employ a differential comparator (not shown) also located in the switch 15. The comparator has an adjustable threshold and produces a digital output pulse for each above-threshold spike on the tip or ring T, R wires. The output digital signal goes to a counter (not shown), which sums the number of counts to produce a rate for above-threshold noise impulses.

Noise measurements may both disqualify and correct predicted data rates of the lines 12–14 being qualified. For high noise levels, synchronization of the line 12–14 for ADSL or ISDN data transmissions becomes impossible, and the noisy line 12–14 must be disqualified. For example, impulse noise rates above about five 150 millivolt-counts-per-second disqualify a line for ADSL transmissions. When noise is not a disqualifier, it still can lower the predicted data rates for the customer line in a manner that generally depends on the modem used with the selected line 12–14.

Referring again to FIG. 1, the customer lines 19, 21 do not connect to the switch 15 and thus, cannot be automatically tested by the measurement unit 22. Thus, speed qualification or disqualification of these lines 19, 21 requires indirect measurements henceforth referred to "proxy measurements".

Proxy measurements are one-ended electrical measurements on a "proxy" line located in the same cable 23 as the unconnected line 19, 21 to be qualified or disqualified. The proxy line connects to the switch 15 and thus, can be tested by one-ended electrical measurements made from the switch 15. For example, the line 14 is a potential proxy line for the line 19 going to the same customer.

The proxy line 14 is located in the same cable 23 as the unconnected lines 19, 21 to be qualified. Thus, both types of lines have undergone the same handling after fabrication of the cable 23. Similarly, if the cable 23 has more than 12 different customer lines, e.g., a standard telephony cable, the various lines 12–14, 19, 21 are in very similar cable environments. Then, electrical measurements on the proxy line 14 can, in some cases, provide a reliable measure of the same electrical properties for the unconnected lines 19, 21. The reliability of proxy measurements may further increase if the proxy line goes to the same residence as the unconnected line, e.g., lines 14 and 19. But, proxy measurements may still be reliable if the proxy line is simply in the same cable 23, e.g., the line 13 as a proxy for the line 19.

Line Performance Predictions

Figure 5:
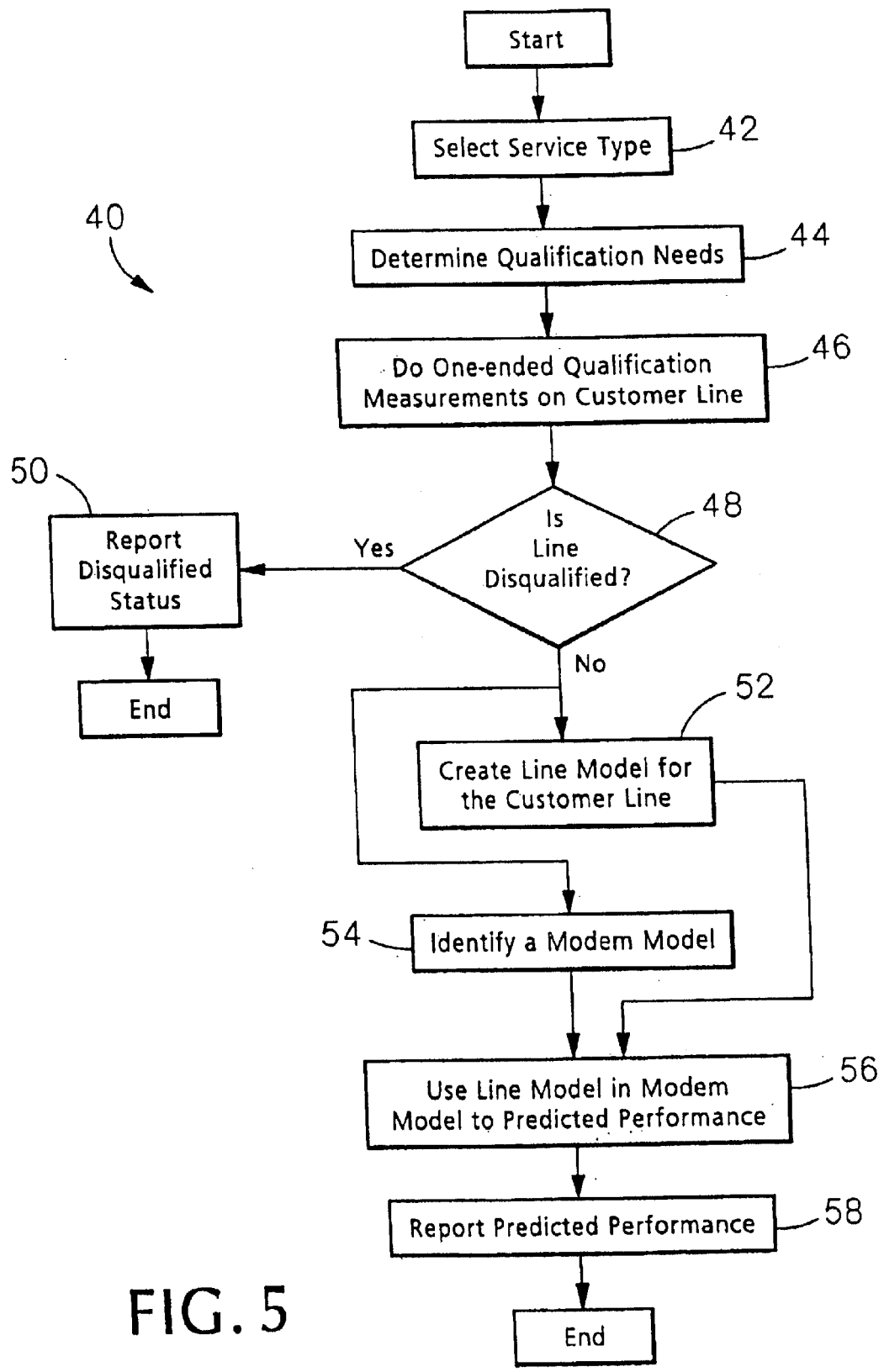
FIG. 5 is a flow chart illustrating a method for speed qualifying a customer line for data transmission.

FIG. 5 is a flow chart illustrating a method 40 of speed qualifying or disqualifying a selected one of the customer lines 12–14 of FIG. 1 for data transmissions. The method has two parts. In a first part, the computer 24 and measurement unit 22 of FIG. 1 rapidly determine whether the selected line 12–14 is pre-disqualified for data transmissions. In the second part, the computer 24 predicts the speed for data transmissions if the selected line 12–14 is not disqualified in the first part.

To determine whether the selected customer line 12–14 is disqualified for transmitting data, the computer 24 or an operator selects the type of data service to be implemented on the selected customer line 12–14 (step 42). Next, the computer 24 determines the qualification requirements for the selected type of data service on the selected line 12–14 (step 44). Next, the computer 24 and measurement unit 22 perform one-ended electrical measurements on the selected customer line (step 46). Then, the computer 24 determines from the one-ended measurements whether the selected customer line 12–14 is disqualified for the selected type of data transmissions (step 48). If the selected customer line 12–14 is disqualified, the computer reports the disqualification status and stops.

The pre-disqualification part of the method 40 is generally more rapid than predicting the actual data rates obtainable. U.S. patent application Ser. No. 60/106,845, filed Nov. 3, 1998, provides detailed account of some types of measurements and determinations performed in pre-disqualification steps 42, 44, 46, 48. These steps may also include further tests specific to the type of termination at the customer units 16–18. For example, for ADSL-lite data transmissions the fact that a customer unit 16–18 attenuates high frequencies could be used as a disqualifier test.

If the selected customer line 12–14 is not pre-disqualified at step 48, the computer 24 will predict the data rate of the selected line 12–14 for data transmissions. First, the computer 24 creates a line model for the selected customer line 12–14, e.g., by performing more one-ended measurements on the line 12–14 and deriving the line model therefrom (step 52). At substantially the same time, the computer 24 identifies a modem model to be used with the selected customer line 12–14 (step 54). The modem model may correspond to the modem in the central office 20 and/or the modem at the customer's residence. Next, the computer 24 uses the line model for the selected customer line 12–14 in the modem model to predict the line's performance, e.g., the data rate. Some modem models are a data file stored in the computer 24 and indexed by properties of the line model. Finally, the computer 24 reports the line performance when used with the identified modem (step 58).

Figure 6:
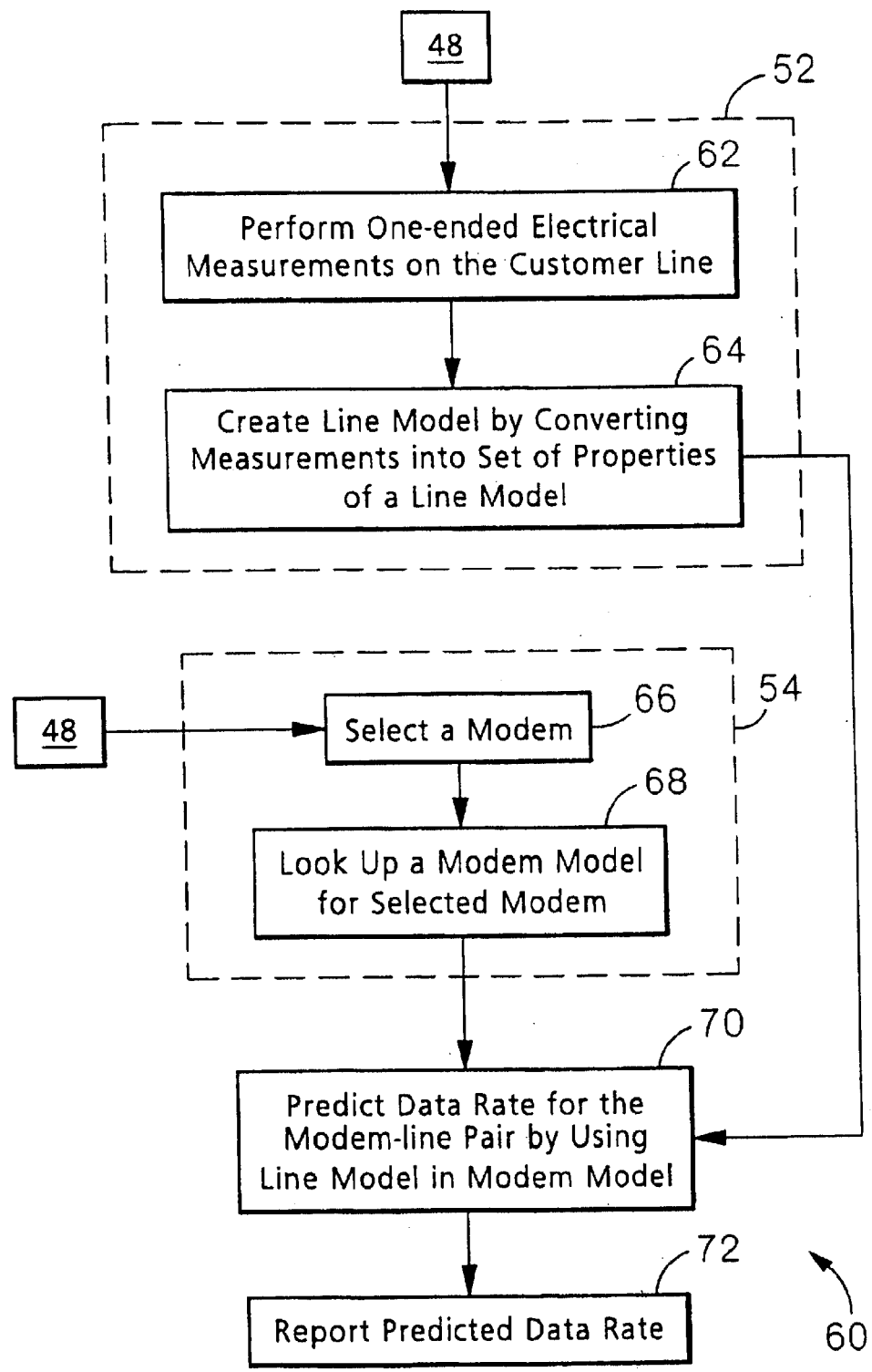
FIG. 6 is a flow chart illustrating a method for predicting the data rate of a line in the method of FIG. 5.

FIG. 6 is a flow chart illustrating a method 60 for predicting the performance of the selected customer line 12–14, which was not pre-disqualified for data transmissions at step 48 of FIG. 5. The computer 24 and measurement unit 24 control one-ended electrical measurements carried out by apparatus 27 on the twisted pair T and R of the selected customer line 12–14 (step 62). The measurements determine the three admittances $Y_{tg}$, $Y_{tr}$, $Y_{rg}$ of the tip and ring wires T, R and the noise levels in the selected customer line 12–14. Next, the computer derives a number of other properties of the selected customer line 12–14 from the one-ended measurements (step 64). As discussed above, the derived properties may include a line length, the existence or absence of one or more bridged taps, the gauge mix of the line, impulse noise level, frequency dependent attenuation, normalized line length, and the noise spectrum.

From these derived properties, the computer 24 calculates a second-level derived property-the average normalized line length. The average normalized line length is the length of 26 gauge paired twisted copper wires, located in a telephony cable 23 with at least 12 other twisted wire pairs, which would have substantially the same transmission properties.

The computer 24 also selects a modem, e.g., in response to a customer's request or a TELCO's command to speed qualify or disqualify the line for a particular modem type (step 66). Next, the computer 24 looks up a modem model for the selected modem in a database (step 68). The modem model is a table of performance data, i.e., data transmission rates, indexed by the averaged normalized line length and the line noise level. The computer 24 may leave the modem model in active memory while waiting for data on the line model associated with the selected customer line 12–14. Next, the computer uses the line model data in the modem model to find a predicted data rate for the selected modem in association with the selected customer line 12–14 (step 70). Finally, the computer 24 reports the predicted data rate to the customer or to a readable storage device (step 72).

Figure 7:
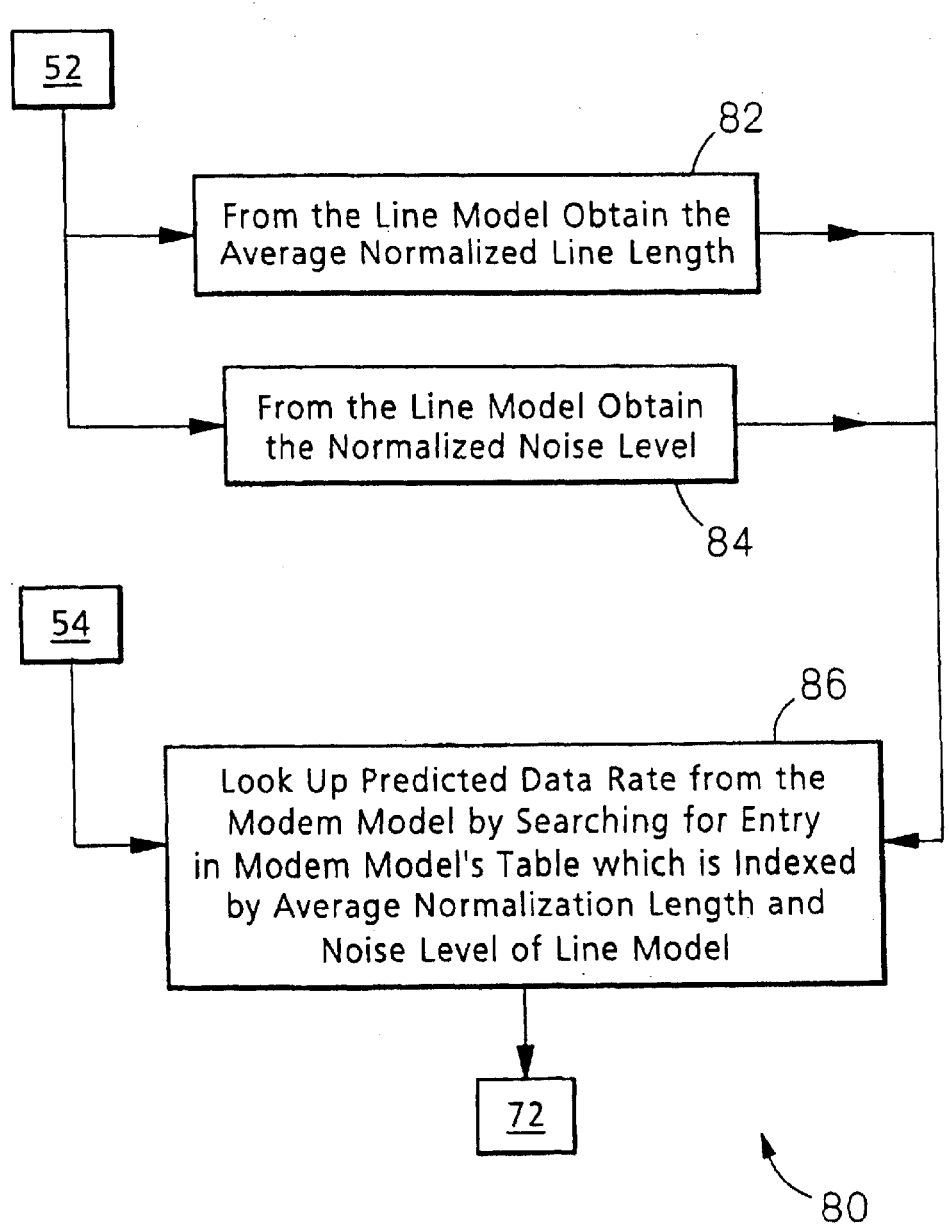
FIG. 7 is a flow chart illustrating a method for predicting the data rate from line and modem models.

FIG. 7 is a flow chart illustrating one method for predicting the data rate of the selected customer line 12–14 as shown in step 70 of FIG. 6. The line model is either a set of rules or a file for the properties characterizing the model. From the line model, the computer 24 reads the average normalized line length (step 82). Similarly, the line model or one-ended measurements determine a normalized noise level associated with the selected customer line 12–14 (step 84). Finally, the computer 24 performs a look up of a predicted data rate in a table defining the modem model (step 86). The modem model's table is indexed by the averaged normalized line length and the normalized noise level. The table is a tabular form representing the modem model for the modem to be used with the selected customer line 12–14.

Figure 8:
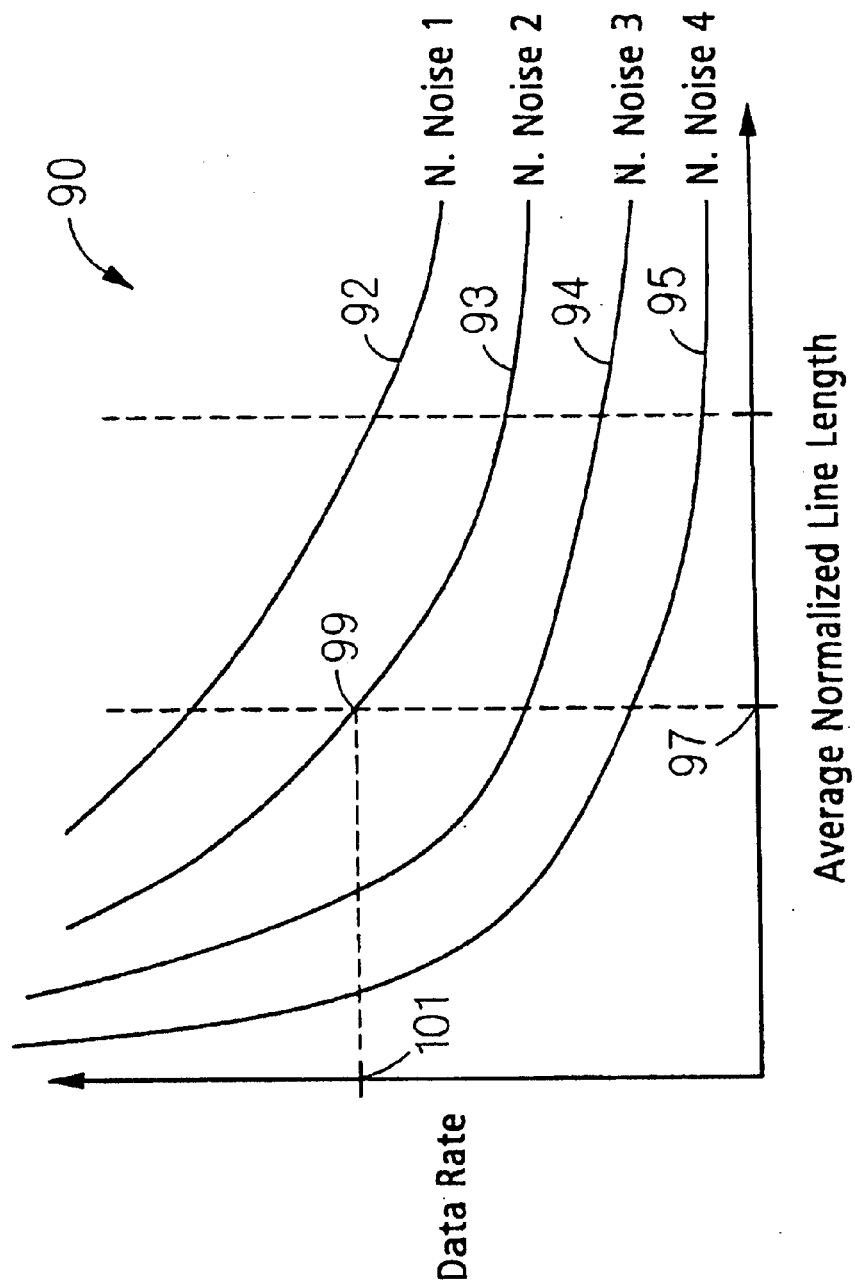
FIG. 8 is a graphical representation of the method of FIG. 6 for a modem model in which the data rate depends on the line's normalized noise level and average normalized line length.

FIG. 8 graphically illustrates one modem model 90 as a set of curves 92–95 for the predicted data rate. The values from the curves 92–95 depend on, i.e., are indexed by, a line's normalized noise level and averaged normalized line length. The separate curves 92–95 give the predicted data rate for four values of the normalized noise level of the line model. Each curve 92–95 is also dependent on the averaged normalized line length, which is plotted along the horizontal axis.

The predicted data rate can be obtained from the modem model 90 of FIG. 8 by performing a look up with the parameters of the line model. To predict the data rate, the computer 24 looks up one of the curves 92–95 using the normalized noise value from the line model, e.g., normalized noise value 2. Next the computer 24 finds the predicted value of the data rate by looking up the averaged normalized line length, given by the line model, on the horizontal axis, e.g., value 97. The value 101 of curve 93 at the intersection 99 with the value 97 of the averaged normalized line length is the predicted data rate. Of course, the computer does the look ups in a data base indexed by the normalized noise level and the average normalized line length instead of graphically.

Some modem models also depend on parameters such as impulse noise compensation, noise floor, echo compensation and phase instability compensation. The impulse noise compensation is the ability of the modem to resychronize or to remain synchronized in the presence of impulse noise on the customer line. The noise floor is the noise level below which the modem does not resolve data signals. The echo compensation is the ability of the modem to compensate for reflected signals in the customer line. The phase instability compensation is the ability of the modem to compensate for time-dependent imbalances in the customer line, e.g., time-dependent reflections.

Using the values of each of these parameters, the computer 24 of FIG. 1 adjusts the predicted data rate from the rate predicted by FIG. 8. The modem models attach a figure-of-merit or quality rating to each of the above parameters. For each parameter, the quality rating may, for example, be excellent, good, or bad. The quality ratings determine whether the predicted data rate, e.g., the rate from FIG. 8, is adjusted up, down or not adjusted by the computer 24 to obtain a final predicted data rate. For example, some embodiments adjust the predicted data rate from FIG. 8 up by 10 percent and down by 10 percent for quality ratings of excellent and bad, respectively.

Similarly, some line models include a gauge mix parameter, which is given a quality rating, i.e., high, average, or low. Data mining techniques can be used to infer a test for the gauge mix of a line from the one-ended electrical measurements. The computer 24 of FIG. 1 adjusts the predicted data rate from the rate predicted by FIG. 8 according to the quality rating of the gauge mix.

Figure 9:
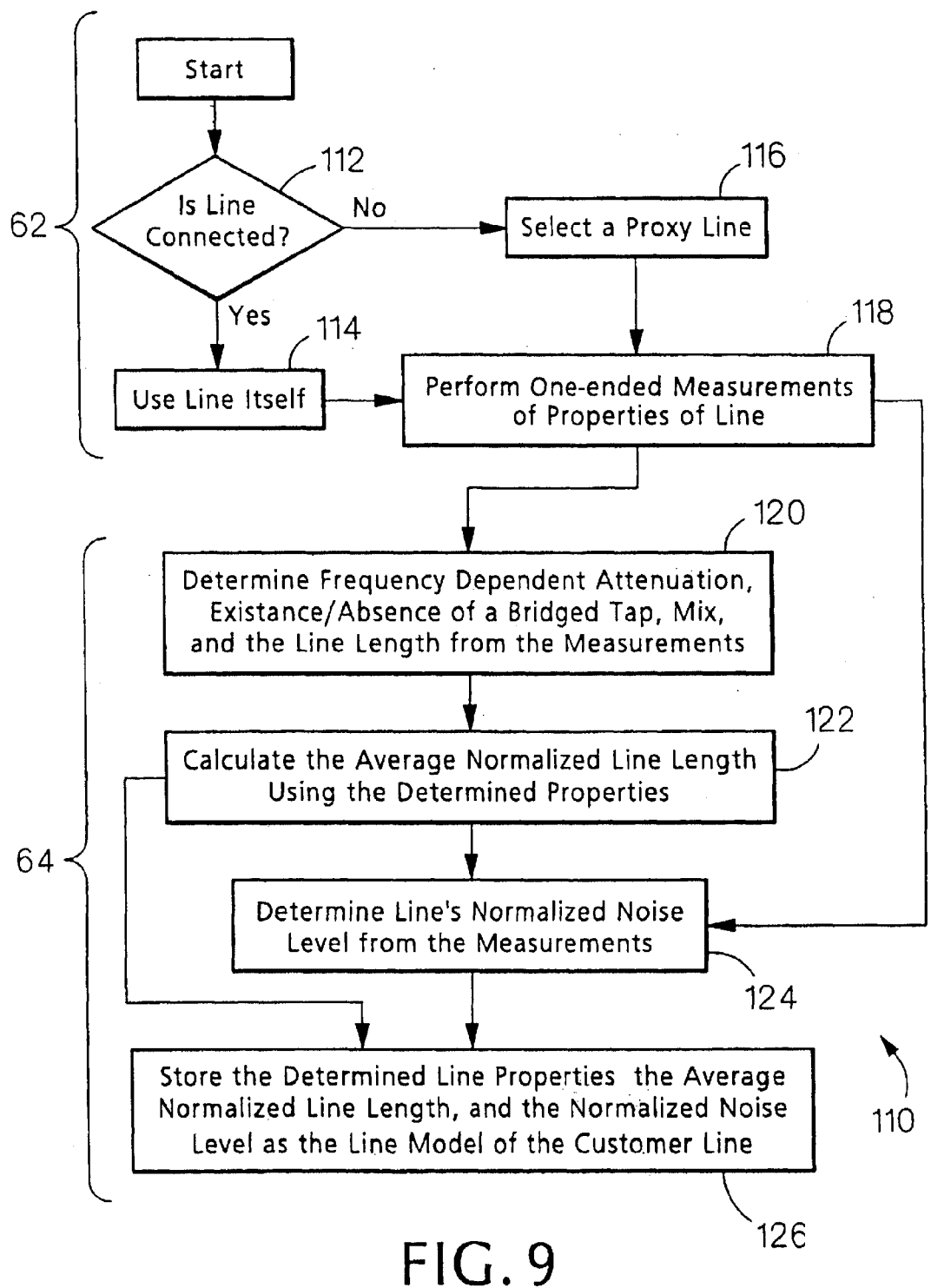
FIG. 9 is a flow chart illustrating a method of finding a line model from one-ended measurements.

FIG. 9 is a flow chart illustrating a method 110 of finding a line model for any selected customer line 12–14, 19, 21, i.e. either connected or unconnected to the switch 15 of FIG. 1. First, the computer 24 determines whether the selected line is connected to the switch 15 (step 112). If the selected line is connected, the computer 24 chooses the selected line itself for one-ended electrical measurements (step 114). If the selected line is unconnected, e.g., the lines 19, 21 of FIG. 1, the computer 24 chooses a proxy line in the same cable 23 for the one-ended electrical measurements (step 116). Next, the computer 24 and measurement unit 22 perform the one-ended measurements of the chosen line's admittances $Y_{tg}$, $Y_{tr}$, $Y_{rg}$ and noise levels as described above (step 118). Next, the computer 245 determines the above-described derived properties for the chosen line from the measured admittances and noise levels as described above (step 120). The derived properties include the frequency dependent attenuation, the absence or existence of a bridged tap, the mix, the frequency-dependent normalized line length, and the averaged normalized line length. From the derived properties, the computer 24 determines the averaged normalized line length using the formula described below (step 122). Similarly, from the measured noise levels of the chosen line, the computer 24 determines the chosen line's normalized noise level. The computer 24 stores the one-ended measurements, the derived electrical properties (step 120), normalized noise level (step 124), and averaged normalized line length (step 122) as the line model for the originally selected line 12–14, 19, 21 (step 126). These stored quantities form a footprint that characterizes the customer line.

The footprint is stored data on the condition of the line when operating well. Later, the computer 24 can call up the footprint to perform speed path testing. When called up, the footprint is useful for fault detection as described in U.S. Pat. No. 5,699,402, which is herein incorporated by reference in its entirety.

The derived properties characterizing the selected customer line 12–14 and modem models used by the methods of FIGS. 4A–4D are found through methods referred to as "data mining". Data mining produces derived properties that are well correlated with the data produced by the models, e.g., high frequency attenuation.

Figure 10:
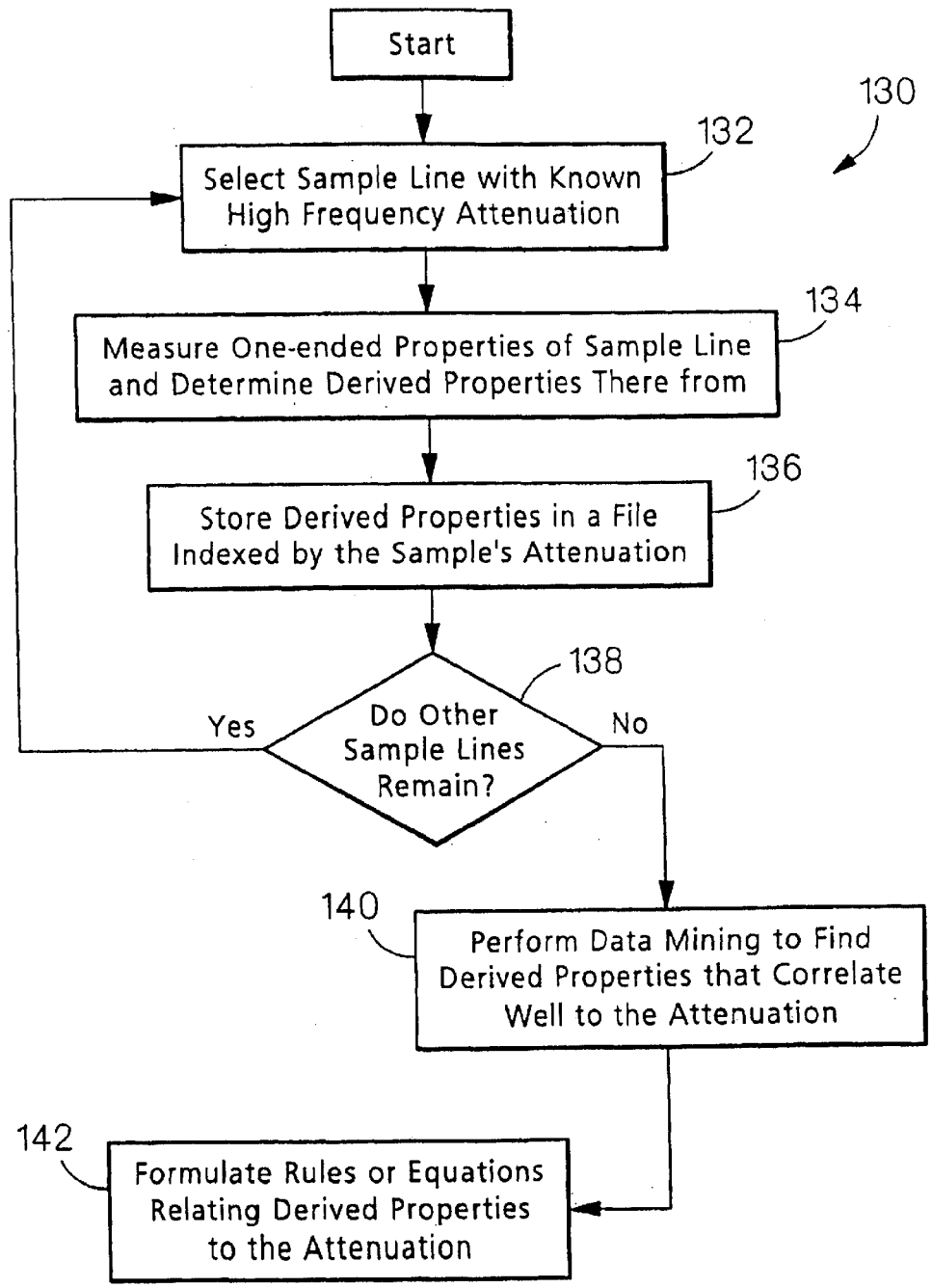
FIG. 10 is a flow chart illustrating the use of data mining to derive rules relating the line attenuation to one-ended measurements.

FIG. 10 illustrates a method 130 for using data mining to find derived properties correlating well with the high frequency attenuation. Data mining starts by selecting a sample line having a known attenuation from a sample pool (step 132). Next, one-ended measurements are performed on the selected sample line and a selected set of derived properties, e.g., low frequency admittances, are found from the measurements (step 134). Next, the values of the selected derived properties are stored in a file indexed by the attenuation of the sample line (step 136). Next, the data mining system determines whether other sample lines remain (step 138). If sample lines remain, the system repeats steps 132, 134, 136, and 138. Otherwise, the system compares the values of the derived properties for the sample lines to determine which properties or sets of properties correlate well with the attenuation (step 140). Finally, the system uses the values of the derived properties correlating well to formulate a set of rules, which determine the attenuation in terms of the well-correlating derived properties (step 142). The "rules" are represented by the methods of FIGS. 4A–4D.

Figure 11:
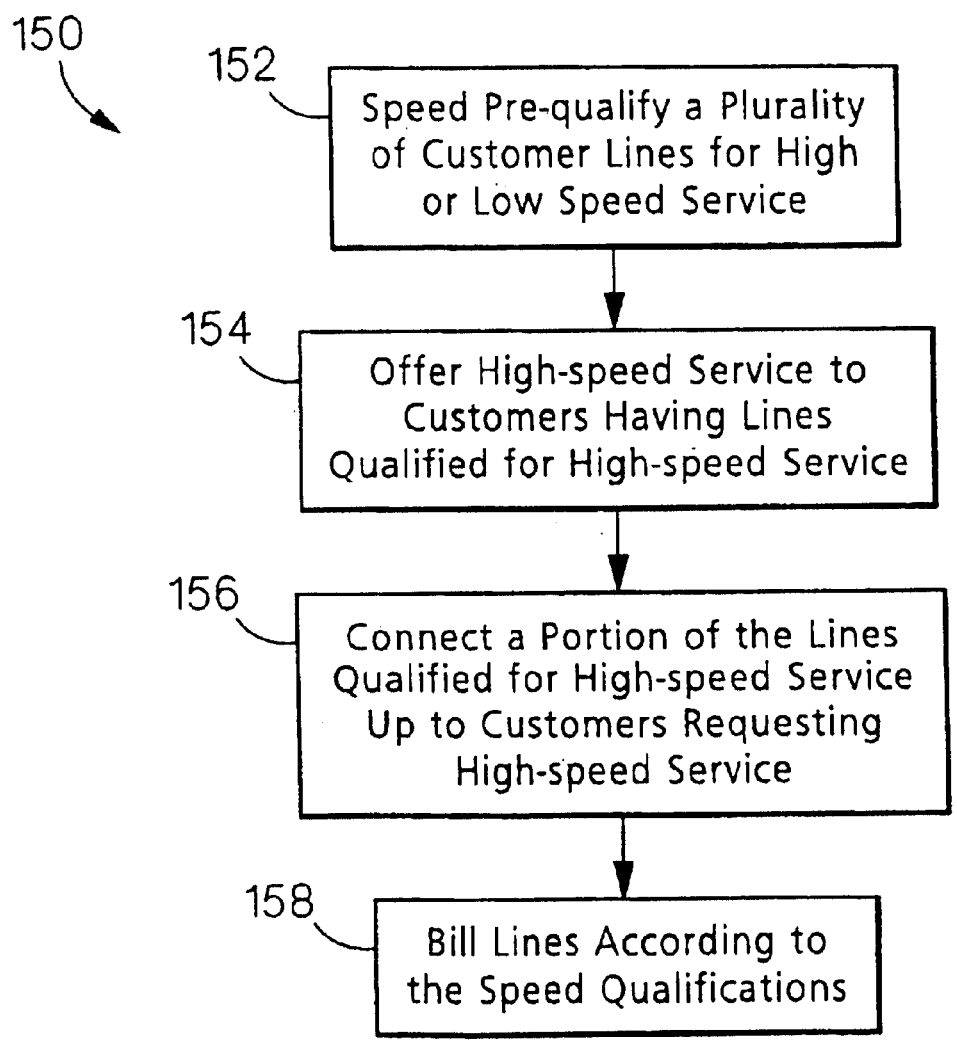
FIG. 11 is a flow chart illustrating a method of marketing telephone lines for data transmission.

FIG. 11 is a flow chart illustrating a method of marketing customer lines for data transmission. First, the computer 24 of FIG. 1 speed pre-qualifies a plurality of the lines 12–14, 19, 21 using one-ended electrical measurements and speed qualification methods described above (step 152). The speed pre-qualification, at least, classifies each line for either high-speed service or low speed service. Next, the TELCO offers high-speed service to a portion of the customers who have lines qualified for the high-speed service (step 154). Next, the TELCO selectively connects at least a portion of the lines qualified for high-speed service to customers requesting the high-speed service (step 156). The TELCO also sets billing rates for, at least, a portion of the lines at prices that depend on the speed qualification (step 158).

Other embodiments are within the scope of the following claims.

What is claimed is:

1. A method of predicting performance of a customer line for data transmission, comprises:

making one-ended measurements of electrical properties of the customer line from a central location;

identifying a line model for the customer line from the measurements;

identifying a modem model for a modem selected for use with the line, the modem model providing performance data on the selected modem; and predicting performance data for the customer line when operated with the selected modem by combining the line and modem models.

2. The method of claim 1, wherein the performance data comprises a data transmission rate.

3. The method of claim 2, further comprising:

predicting whether the customer line is disqualified for data transmission; and wherein the act of predicting performance data is in response to predicting that the line is not disqualified.

4. The method of claim 1, wherein the act of measuring includes using the measurements to evaluate at least one admittance of the customer line at a plurality of frequencies.

5. The method of claim 4, wherein the act of measuring includes finding at least two of $Y_{tr}$, $Y_{rg}$, and $Y_{tg}$ for the customer line.

6. The method of claim 5, wherein the act of identifying a line model comprises:
  determining a frequency dependent attenuation from the admittances; and
  determining a normalized line length from the frequency dependent attenuation.

7. The method of claim 4, wherein the act of identifying a line model comprises:
  determining whether the customer line has a bridged tap.

8. The method of claim 1, wherein the act of identifying a line model includes finding a frequency dependent line attenuation from the measurements.

9. The method of claim 1,
  wherein the act of measuring includes driving the customer line with a signal at a plurality of frequencies; and
  the act of identifying a line model includes evaluating a property of the customer line for frequencies high with respect to the frequencies of the signal.

10. The method of claim 1, wherein the act of measuring includes finding a noise level, a capacitance, and frequency dependent admittances for the customer line.

11. The method of claim 2, wherein the modem model indexes predicted data rates by an averaged normalized line length and a noise level of the customer line.

12. A method of speed qualifying a customer line for data transmission, comprises:
  identifying a proxy line in a cable carrying the customer line;
  performing one-ended electrical measurements on the proxy line;
  identifying a line model for the proxy line from the measurements;
  identifying a modem model for a modem to use with the customer line; and
  combining the modem model with the line model to predict a data rate.

13. The method of claim 12, wherein the act of identifying a line model includes finding at least two of $Y_{tr}$, $Y_{rg}$, and $Y_{tg}$ for the proxy line at a plurality of frequencies.

14. The method of claim 13, further comprising one of inferring a mix of wire gauges and inferring the presence of a bridged tap from the found admittances.

15. The method of claim 13, wherein the act of identifying a line model includes finding a frequency dependent line attenuation from the measurements.

16. A method of speed qualifying a customer line for data transmission, comprises:
  identifying a proxy line in a cable carrying the customer line;
  performing one-ended electrical measurements on the proxy line; and
  predicting a data rate for the customer line from the measurements;
  wherein the act of performing includes driving the proxy line with a signal having a plurality of frequencies; and
  the act of identifying a line model includes evaluating a property of the proxy line for frequencies high with respect to the frequencies of the signal.

17. The method of claim 12, wherein the modem model indexes predicted data rates by an averaged normalized line length and a noise level of the customer line.

18. A method of marketing telephone lines to customers, comprising:
  speed pre-qualifying a plurality of the customer lines using one-ended electrical measurements performed from a central location;
  setting billing rates of at least a portion of the lines at prices that depend on the speed qualification of the portion;
  monitoring a portion of the customer lines after being placed in service by repeatedly performing one-ended electrical measurements on the portion; and
  determining new data rates of each line of the portion from the repeated measurements;
  wherein at least a portion of the acts of speed qualification include performing electrical measurements on a proxy line.

19. A method of marketing telephone lines to customers, comprising:
  speed pre-qualifying a plurality of the customer lines using one-ended electrical measurements performed from a central location;
  setting billing rates of at least a portion of the lines at prices that depend on the speed qualification of the portion;
  wherein at least a portion of the acts of speed qualification include performing electrical measurements on a proxy line; and
  wherein each act of speed pre-qualifying, includes measuring electrical properties of one of the lines from the central location, identifying a line model for the one of the lines from the measured electrical properties, identifying a modem model for a modem to use with the one of the lines, the modem model to provide rate data on the selected modem; and predicting a data rate for the one of the lines when operated with the selected modem by combining the line and modem models.

20. The method of claim 19, the act of speed pre-qualifying the one of the lines further comprising:
  predicting whether the one of the lines is disqualified for data transmission; and
  wherein the act of predicting a data rate is in response to predicting that the one of the lines is not disqualified.

21. A method of marketing telephone lines to customers, comprising:
  speed pre-qualifying a plurality of customer lines from one-ended electrical measurements made by a test unit switchably connected to the plurality of customer lines, the speed pre-qualifying including classifying the lines for at least high speed digital service or low speed digital service; and
  selectively offering the high-speed service to at least a portion of the customers having lines qualified to support high-speed digital service;
  wherein each act of speed qualifying comprises:
  measuring electrical properties of one of the lines from the central location;
  identifying a line model for the one of the lines from the electrical properties;
  identifying a modem model for use with the one of the lines, the modem model providing data rates for the selected modem; and
  predicting a data rate for the one of the lines when operated with the selected modem by combining the line and modem models.

22. A method of marketing telephone lines to customers, comprising:

speed pre-qualifying each line for high-speed digital service or low-speed digital service by using one-ended electrical measurements;

receiving requests for high speed digital data service from customer; and connecting at least a portion of the lines qualified for high-speed digital service to customers requesting high-speed digital service in response to receiving said requests;

wherein at least a portion of the measurements are performed on a proxy line.

23. The method of claim 22, wherein each act of speed pre-qualifying comprises:

measuring electrical properties of one of the lines from the central location;

identifying a line model for the one of the lines from the electrical properties;

identifying a modem model for use with the one of the lines, the modem model providing transmission rate data on the selected modem; and predicting a data rate for the one of the lines when operated with the selected modem by combining the line and modem models.

24. A system for characterizing performance of customer lines for data transmission, comprising:

a computer;

a telephony switch coupled to a portion of the lines and adapted to connect the portion to a network, to perform one-ended electrical measurements on the portion, and to transmit the measurements to the computer;

a measurement unit coupled to the switch and computer, the unit to make the measurements on a selected line at a lower frequency in response to receiving a command from the computer, the computer to predict data rates at a higher frequency for the selected line from the measurements, the computer being further adapted to:

predict whether the selected line is disqualified for data transmission from the measurements thereon;

wherein:

the computer is adapted to determine a frequency dependent attenuation from the measurements; and the computer is adapted to command the measurement unit to order measurements on proxy lines and to predict data rates for a portion of the customer lines by using the measurements on the proxy lines.

25. The system of claim 24, wherein the computer is adapted to:

identify a line model for the selected line from the measurements thereon;

identify a modem model for use with the selected line; and predict a data rate for the selected line when operated with the selected modem by combining the line and modem models.

26. A program storage device encoding an executable program for a method of speed qualifying telephone lines for data transmission, the method comprising:

making one-ended measurements of electrical properties of a customer line from a central location;

identifying a line model for the customer line from the measurements;

identifying a modem model for use with the line, the modem model providing data rates of the selected modem; and predicting a data rate for the customer line when operated with the selected modem by combining the line and modem models.

27. The device of claim 26, the method further comprising:

predicting whether the customer line is disqualified for data transmission; and wherein the act of predicting a data rate is performed in response to predicting that the line is not disqualified.

28. The device of claim 26, wherein the act of measuring includes finding at least one admittance of the customer line at a plurality of frequencies by using the measurements.

29. The device of claim 28, wherein the act of measuring includes finding at least two of $Y_{tr}$, $Y_{rg}$, and $Y_{tg}$ for the customer line.

30. The device of claim 28, wherein the act of identifying a line model includes finding a frequency dependent line attenuation from the measurements.

31. The device of claim 28, wherein the act of identifying a line model comprises:

determining a frequency dependent attenuation from the admittances; and determining a normalized line length from the frequency dependent attenuation.

32. The device of claim 26, wherein the modem model lists predicted data rates by averaged normalized line length and noise level of the customer line.

33. The device of claim 32, the method further comprising:

modifying the predicted data rate in response to a value of one or more quality parameters, the values characterizing the selected modem.

34. The device of claim 33, wherein the parameters are selected from the group consisting of impulse noise compensation, noise floor, echo compensation and phase instability compensation.

35. The device of claim 26, the method further comprising:

identifying the customer line as a proxy line for a second telephone line; and predicting a data rate for the second line from the data rate predicted for the proxy line.

36. A method of determining the attenuation of a customer's telephony line, comprising:

connecting a test unit to the customer's telephony line through a switch connecting a plurality of customer telephony lines to a telephone network;

performing a plurality of one-ended measurements through the switch of frequency dependent admittances of the customer's telephony line, the measurements being performed at a plurality of frequencies in a lower frequency range;

processing the measurements by a set of logical decision trees derived by data mining; and adjusting values of a frequency-dependent attenuation for an average telephony line to predict an attenuation of the customer's telephony line in a higher frequency range, the act of adjusting being responsive to results from the logical decision trees.

37. The method of claim 36, wherein the act of performing includes finding at least two of $Y_{tr}$, $Y_{rg}$, and $Y_{tg}$ for the customer's telephony line.

38. A method of determining performance of a customer telephone line, the line having both a tip wire and a ring wire, comprising:

driving one of the two wires with a first alternating voltage at one end and the other of the two wires with a second voltage at the same end and measuring voltages between each wire and ground while driving the two wires;

driving the other of the two wires with a third alternating voltage at the same end and the one of the two wires with a fourth voltage at the same end and measuring voltages between each wire and ground while driving the two wires;

driving both the tip and the ring wires with a fifth alternating voltage from the same end and measuring voltages at the tip and ring wires while driving both wires; and determining admittance $Y_{tg}$ at a plurality of frequencies from the measured voltages.

39. The method of claim 38, further comprising:

determining an apparent length of the customer line from values of said admittance at a plurality of frequencies.

40. The method of claim 38, further comprising:

determining whether the customer line has a bridged tap from values of said admittance at a plurality of frequencies.

41. The method of claim 38, further comprising:

determining the remaining admittances $Y_{rg}$ and the admittance $Y_{rt}$ at a plurality of frequencies from the measured voltages.

42. The method of claim 41, further comprising:

determining a frequency-dependent attenuation of the line from the measured admittances.

43. The method of claim 42, further comprising:

predicting a data rate for the line from the attenuation; and adjusting the predicted data rate in response to a rating of a gauge mix of the line.

44. The method of claim 42, further comprising:

determining whether the customer line has a bridged tap from values of said admittances at a plurality of frequencies;

predicting a data rate for the line from the attenuation; and adjusting the predicted data rate in response to determining that the customer line has a bridged tap.

45. A method of detecting a bridged tap in a customer line, comprising:

making one-ended electrical measurements over a range of frequencies on the customer line;

determining one or more admittances as a function of frequency of the customer line from the measurements; and detecting that the customer line has a bridged tap in response to finding a the ratio of the imaginary part to the real part of a derivative of admittance as a function of frequency exceeds a threshold.

46. The method of claim 45, wherein the method is used in qualifying a line for high speed data services and the one ended measurements are made at a range of frequencies that are below the frequency of the high speed data services signals.

47. The method of claim 45, wherein the one or more admittances is an admittance between a wire of the customer line and ground.

48. The method of claim 45, wherein the act of making one-ended measurements performs the measurements through a voice test access of a telephony switch.

49. The method of claim 45, wherein detecting comprises:

determining whether a ratio of imaginary and real parts of a frequency derivative of the one or more admittances has a peak; and wherein the determining is based on finding an above threshold peak in the ratio.

* * * * *

UNITED STATES PATENT AND TRADEMARK OFFICE
CERTIFICATE OF CORRECTION

PATENT NO. : 6,895,081 B1
APPLICATION NO. : 09/294563
DATED : May 17, 2005
INVENTOR(S) : Kurt E. Schmidt, David J. Groessl and Yun Zhang It is certified that error appears in the above-identified patent and that said Letters Patent is hereby corrected as shown below:

In the Specification:

Column 4, line 62, delete "Appendix" and insert therefore --Table--

Column 5, before line 1 insert:

--Table 1

$f_i$:
150, 600, 1050, 1500, 1950, 2400, 2850, 3300, 3750, 4200, 4650, 5100, 5550, 6000, 6450, 6900, 7350, 7800, 8250, 8700, 9150, 9600, 10050, 10500, 10950, 11400, 11850, 12300, 12750, 13200, 13650, 14100, 14550, 15000, 15450, 15900, 16350, 16800, 17250, 17700, 18150, 18600, 19050, 19500, 19950.

N:
1, 4, 7, 10, 13, 16, 19, 22, 25, 28, 31, 34, 37, 40, 43, 46, 49, 52, 55, 58, 61, 64, 67, 70, 73, 76, 79, 82, 85, 88, 91, 94, 97, 100, 103, 106, 109, 112, 115, 118, 121, 124, 127, 130, 133 respectively.

$\psi_i$:
5.9738, 1.3564, 2.4683, 4.8575, 4.7434, 2.2972, 4.6015, 1.9156, 2.5660, 4.5986, 4.6452, 3.4542, 3.6341, 0.8848, 4.3410, 2.1606, 4.2342, 4.2147, 3.1058, 5.909, 5.2782, 5.1159, 5.4354, 5.6124, 0.5751, 3.8940, 3.3812, 6.0230, 2.3239, 2.7284, 4.8032, 4.1488, 2.3427, 4.6362, 0.9163, 2.9335, 1.0363, 2.3272, 3.2040, 4.0025, 2.0028, 5.8444, 2.4525, 1.4760, 1.770 --

Column 5, line 67 delete "Appendix" and insert therefore --Table--.

Column 6, line 1 delete "Appendix" and insert therefore --Table--.

Column 6, following line 3, insert:

UNITED STATES PATENT AND TRADEMARK OFFICE
CERTIFICATE OF CORRECTION

PATENT NO. : 6,895,081 B1
APPLICATION NO. : 09/294563
DATED : May 17, 2005
INVENTOR(S) : Kurt E. Schmidt, David J. Groessl and Yun Zhang It is certified that error appears in the above-identified patent and that said Letters Patent is hereby corrected as shown below:

--Table 2

30Hz Raw Measurements:
Ytr(30) – Admittance tip-to-ring measured at 30Hz
Ytg(30) – Admittance tip-to-ground measured at 30Hz
Yrg(30) – Admittance ring-to-ground measured at 30Hz

30Hz Derived Measurements:
30Gtr – Conductance tip-to-ring measured at 30Hz = real(Ytr(30))
30Str – Susceptance tip-to-ring measured at 30Hz = imag(Ytr(30))
30Gtg – Conductance tip-to-ground measured at 30Hz = real (Ytg(30))
30Stg – Susceptance tip-to-ground measured at 30Hz = imag(Yt(30))
30Ctr – Capacitance tip-to-ring measured at 30Hz = Str(30)/(2*pi*30)
30Ctg – Capacitance tip-to-ground measured at 30Hz = St(30)/(2*p$_i$*30)
Lmeas – Length in kft measured at 30Hz = 30Ctg/17.47

150Hz-20KHz Raw Measurements:
Ytr(f) – Admittance tip-to-ring where f=150Hz,600Hz, 1050Hz, 1500Hz,... 19950Hz
Ytg(f) – Admittance tip-to-ground where = 150Hz, 600Hz, 1050Hz, 1500Hz.... 19950Hz
Yrg(f) – Admittance ring-to-ground where f = 150Hz, 600Hz, 1050Hz, 1500Hz,... 19950Hz

150Hz-20KHz Derived Measurements:
150Gtr – Conductance tip-to-ring measured at 150HZ = real(Ytr(150))
600Gtr – Conductance tip-to-ring measured at 600Hz = real(Ytr(600))

19950Gtr – Conductance tip-to-ring measured at 19950Hz = real Ytr(19950))

150Str – Susceptance tip-to-ring measured at 150Hz = imag(Ytr(150))
600Str – Susceptance tip-to-ring measured at 600Hz = imag(Ytr(600))

19950Str – Susceptance tip-to-ring measured at 19950Hz = imag(Ytg(19950))

150Gtg – Conductance tip-to-ground measured at 150Hz = real(Ytg(150))
600Gtg – Conductance tip-to– ground measured at 600Hz = real (Ytg(600)

19950Gtg – Conductance tip-to-ground measured at 19950Hz = real (Ytg(19950))

150Stg – Susceptance tip-to-ground measured at 150Hz = imag(Ytg(150))
600Stg – Susceptance tip-to-ground measured at 600Hz = imag(Ytg(600))

UNITED STATES PATENT AND TRADEMARK OFFICE
CERTIFICATE OF CORRECTION

PATENT NO. : 6,895,081 B1
APPLICATION NO. : 09/294563
DATED : May 17, 2005
INVENTOR(S) : Kurt E. Schmidt, David J. Groessl and Yun Zhang It is certified that error appears in the above-identified patent and that said Letters Patent is hereby corrected as shown below:

19950Stg – Susceptance tip-to-ground measured at 19950Hz = imag(Ytg(19950))

150Ctr – Capacitance tip-to-ring measured at 150Hz = 150Str/(2*pi*150)
600 Ctr – Capacitance tip-to-ring measured at 600Hz = 600Str/(2*pi*600)

19950Ctr – Capacitance tip-to-ring measured at 19950Hz = 9950Str/(2*pi*19950)

150Ctg – Capacitance tip-to-ground measured at 150Hz = 150Stg/(2*pi*150)
600Ctg – Capacitance tip-to-ground measured at 600Hz = 600Stg/(2*pi*600)

19950Ctg – Capacitance tip-to-ground measured at 19950Hz = 19950Stg/(2*pi*19950)

150Hz-20KHz Secondary Derived Measurements:
C30/C4K – Ratio of tip-to-ground Capacitance at 30Hz to 4200Hz
C4K/C10K – Ratio of tip-to-ground Capacitance at 4200Hz to 10050Hz
Cslope – Tip-to-ground Capacitance ratio slope = (C4K/C10K)/(C30/C4K)
C30-C4K – Difference in tip-to-ground Capacitance at 30Hz and 4200Hz
C4K-C10K – Difference in top-to-ground Capacitance at 4200Hz and 10050Hz
Cdelta– Tip-to-ground Capacitance difference delta = (C4K-C10K)/(C30-C4K)

G4K-G30 – Ratio of tip-to-ground Conductance at 4200Hz and 30Hz
G10K-G4K – Ratio in tip-to-ground Conductance at 10050Hz and 4200Hz
Gslope– Tip-to-ground Conductance ratio slope = (G10K/G4K)/(G4K/G30)
G4K-G30 – Difference in tip-to-ground Conductance at 30Hz and 4200Hz
G10K-G4K – Difference in tip-to-ground Conductance at 4200Hz and 10050Hz
Gdelta – Tip-to-ground Conductance difference delta = (G10K-G4K)/(G4K-G30)

C30/G30 – Ratio of Tip-to-ground Capacitance to Conductance at 30Hz
C30/G4K – Ratio of Tip-to-ground Capacitance at 30Hz to Conductance at 4200Hz
C4K/G4K – Ratio of Tip-to-ground Capacitance to Conductance at 4200Hz Gtr_dmax – Maximum positive slope of Gtr(f) = max(derivative(Gtr(f)/df))
Gtr_fmax – Frequency at which Gtr_dmax occurs
Gtr_dmin – Maximum negative slope of Gtr(f) = min(derivative(Gtr(f)/df))
Gtr_fmin – Frequency at which Gtr_dmin occurs
Gtr_fpk – Frequency of first peak (local maxima)in Gtr(f)
Gtr-fval – Frequency of first valley(local minima)in Gtr(f)
Gtr_d_delta – Gtr Max/Min Derivative difference = Gtr_dmax-Gtr_dmin
Gtr_pk_delta – Gtr peak/valley frequency difference = Gtr_fval-Gtr_fpk
Gtr_pk – Value of Gtr(f) at frequency Gtr_fpk
Gtr_val – Value of Gtr(f) at frequency Gtr_fval
Gtr_delta – Gtr peak/valley difference = Gtr_pk-Gtr_val

UNITED STATES PATENT AND TRADEMARK OFFICE
CERTIFICATE OF CORRECTION

PATENT NO. : 6,895,081 B1
APPLICATION NO. : 09/294563
DATED : May 17, 2005
INVENTOR(S) : Kurt E. Schmidt, David J. Groessl and Yun Zhang It is certified that error appears in the above-identified patent and that said Letters Patent is hereby corrected as shown below:

Gtg_dmax – Maximum positive slope of Gtg(f) = max(derivative(Gtg(f)/df))
Gtg_fmax – Frequency at which Gtg_dmax occurs
Gtg_dmin – Maximum negative slope of Gtg(f) = min(derivative(Gtg(f)/df))
Gtg_fmin – Frequency at which Gtg_dmin occurs
Gtg_d_delta – Gtg Max/Min Derivative difference = Gtg_dmax-Gtg_dmin Ctr_dmax – Maximum positive slope of Ctr(f) = max(derivative(Ctr(f)/df))
Ctr_fmax – Frequency at which Ctr_dmax occurs
Ctr_dmin – Maximum negative slope of Ctr(f) = min(derivative(Ctr(f)/df))
Ctr_fmin – Frequency at which Ctr_dmin occurs
Ctr_fpk – Frequency of first peak (local maxima)in Ctr(f)
Ctr_fval – Frequency of first valley(local minima)in Ctr(f)
Ctr_d_delta – Ctr Max/Min Derivative difference = Ctr_dmax-Ctr_dmin
Ctr_pk_delta – Ctr peak/valley frequency difference = Ctr_fval-Ctr_fpk
Ctr_val – Value of Ctr(f) at frequency Ctr_fval Ctg_dmax – Maximum positive slope of Ctg(f) = max(derivative(Ctg(f)/df))
Ctg_fmax – Frequency at which Ctg_dmax occurs
Ctg_dmin – Maximum negative slope of Ctg(f) = min(derivative(Ctg(f)/df))
Ctg_fmin – Frequency at which Ctg_dmin occurs
Ctg_d_delta – Ctg Max/Min Derivative difference = Ctg_dmax-Ctg_dmin Str_dmax – Maximum positive slope of Str(f) = max(derivative(Str(f)/df))
Str_fmax – Frequency at which Str_dmax occurs
Str_dmin – Maximum negative slope of Str(f) = min(derivative(Str(f)/df))
Str_fmin – Frequency at which Str_dmin occurs

150Hz-20Hz Secondary Derived Measurements:
Str_fpk – Frequency of first peak (local maxima)in Str(f)
Str_fval – Frequency of first valley(local minima)in Str(f)
Str_d_delta – Str Max/Min Derivative difference = Str_dmax-Str_dmin
Str_pk_delta – Str peak/valley frequency difference = Str_fval-Str_fpk
Str_pk – Value of Str(f) at frequency Str_fpk
Str_val – Value of Str(f) at frequency Str_fval
Str_delta – Str peak/valley difference = Str_pk_Str_val

UNITED STATES PATENT AND TRADEMARK OFFICE
CERTIFICATE OF CORRECTION

PATENT NO. : 6,895,081 B1
APPLICATION NO. : 09/294563
DATED : May 17, 2005
INVENTOR(S) : Kurt E. Schmidt, David J. Groessl and Yun Zhang It is certified that error appears in the above-identified patent and that said Letters Patent is hereby corrected as shown below:

Stg_dmax – Maximum positive slope of Stg(f) = max(derivative (Stg(f)/df))
Stg_fmax – Frequency at which Stg_dmax occurs
Stg_dmin – Maximum negative slope of Stg(f) = min(derivative (Stg(f)df))
Stg_fmin – Frequency at which Stg_dmin occurs
Stg_fpk – Frequency of first peak (local maxima)in Stg(f)
Stg_fval – Frequency of first valley(local mixima)in Stg(f)
Stg_d_delta – Stg Max/Min Derivative difference = Stg_dmax-Stg_dmin
Stg_pk_delta – Stg peak/valley frequency difference = Stg_fval-Stg_fpk Gtg20k/Gtg8k – Ratio of Gtg at 19950Hz and 8250Hz
Gtg20k/Gtg4k – Ratio of Gtg at 19950Hz and 4200Hz
Cgt30/Cgt20k – Ratio of Ctg at 30Hz and 19950Hz
Cgt30/Cgt8k – Ratio of Ctg at 30Hz and 8250Hz--

Signed and Sealed this

First Day of January, 2008

JON W. DUDAS
*Director of the United States Patent and Trademark Office*